(12) United States Patent
Chatterjee

(10) Patent No.: US 8,606,260 B2
(45) Date of Patent: Dec. 10, 2013

(54) LOCATION-BASED PROFILE

(75) Inventor: Shuvo Chatterjee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 12/859,253

(22) Filed: Aug. 18, 2010

(65) Prior Publication Data

US 2012/0046040 A1 Feb. 23, 2012

(51) Int. Cl.
| | |
|---|---|
| H04W 24/00 | (2009.01) |
| H04W 4/00 | (2009.01) |
| H04B 17/00 | (2006.01) |
| H04L 12/26 | (2006.01) |
| H04L 12/28 | (2006.01) |
| H04L 1/00 | (2006.01) |
| H04J 3/14 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl.
USPC ............ 455/424; 455/67.11; 455/456.1; 455/423; 455/422.1; 370/241; 370/254

(58) Field of Classification Search
USPC ......... 455/456, 2, 456.3, 456.4, 456.5, 456.6, 455/424, 67.11, 456.1–6, 566, 423, 422.1; 370/241, 254
See application file for complete search history.

(56) References Cited

U.S. PATENT DOCUMENTS

| | | | |
|---|---|---|---|
| 6,597,906 B1 | 7/2003 | Van Leeuwen et al. | |
| 2004/0151148 A1* | 8/2004 | Yahagi | 370/338 |
| 2004/0152362 A1* | 8/2004 | Carter et al. | 439/660 |
| 2006/0025142 A1* | 2/2006 | Hamilton | 455/446 |
| 2006/0128371 A1* | 6/2006 | Dillon et al. | 455/423 |
| 2006/0270421 A1* | 11/2006 | Phillips et al. | 455/457 |
| 2009/0170528 A1 | 7/2009 | Bull et al. | |
| 2010/0087188 A1* | 4/2010 | Griff et al. | 455/424 |
| 2010/0120414 A1 | 5/2010 | Bellovin | |
| 2010/0127919 A1 | 5/2010 | Curran et al. | |
| 2010/0148947 A1 | 6/2010 | Morgan et al. | |
| 2011/0250875 A1* | 10/2011 | Huang et al. | 455/418 |

FOREIGN PATENT DOCUMENTS

| | | |
|---|---|---|
| WO | WO 2008/050136 | 5/2008 |
| WO | WO 2008/053208 | 5/2008 |

* cited by examiner

*Primary Examiner* — Opiribo Georgewill

(74) *Attorney, Agent, or Firm* — Fish & Richardson P.C.

(57) ABSTRACT

A location determination subsystem of a mobile device can determine a location of the mobile device. A monitoring subsystem of the mobile device can be configured, using a profile, to monitor states of a wireless connection between the mobile device and a communications network. When the monitoring subsystem detects an interruption of the wireless connection, a virtual geofence can be constructed around the location of the mobile device when the interruption occurred. The geofence can indicate a boundary of an enclosed geographic area. The geofence can be associated with a diagnostics profile stored on the mobile device or dynamically retrieved from a server upon occurrence of the interruption. When the mobile device enters the area enclosed by the geofence, the monitoring subsystem can be configured using the diagnostics profile in anticipation of interruptions of connections. Information relating to the interruptions can be anonymously sent to a server for analysis.

22 Claims, 10 Drawing Sheets

640

```
Receiving event notifications from mobile devices, each of the event
notifications including information describing a communication event
occurred on a mobile device, the information including a location
indicator indicating a location where the communication event
                            occurred                           642
```

↓

```
Determining that a category of communication events occur at a
frequency that satisfies a threshold, the category of communication
     events occurring within a statistically identified geofence   644
```

↓

```
Creating an event monitoring profile to configure an event-monitoring
   application program that executes on one of the mobile devices to
 monitor the category of communication events, the monitoring profile
       being associated with the identified geofence            646
```

↓

```
Providing the monitoring profile and the associating geofence to the
   mobile devices to configure the event monitoring program    648
```

FIG. 6B

LOCATION-BASED PROFILE

TECHNICAL FIELD

This disclosure relates generally to location-based data processing on a mobile device.

BACKGROUND

A mobile device can include various subsystems and functions to wirelessly connect to other devices through a communications network. For example, a mobile device can include telephony subsystems and functions that permit voice communication between the mobile device and other devices located remotely. Additionally, the mobile device can include data communication subsystems and functions that permit the mobile device to transmit and receive data through the communications network.

The communications network can include a wireless communications network. For example, a mobile device can be wirelessly connected to a cellular network or a wireless local area network (WLAN) through one or more cell towers or one or more wireless access points, respectively. The wireless connection may be subject to various interruptions. Data transmissions between the mobile device and other devices on the wireless communications network may fail. A call drop event due to the interruptions can occur, where voice communications between the mobile device and a remote device are cut off before the call participants finish their conversation.

Anonymous data, including information on occurrences of the interruptions of the wireless connection can be gathered. The anonymous data can be useful to a manufacturer of the mobile device for improving design of the mobile device and an operator of the communications network for modifying topology of the network to minimize future interruptions.

SUMMARY

Methods, program products, and systems implementing location-based profiles are disclosed. A location-determination subsystem can determine a location of a mobile device. A monitoring subsystem of the mobile device can be configured, using a profile (e.g., default configuration profile), to monitor states of a wireless connection between the mobile device and a communications network. When the monitoring subsystem detects an interruption of the wireless connection, a virtual geofence can be constructed around the location of the mobile device when the interruption occurred. The geofence can indicate a boundary of an enclosed geographic area. The geofence can be associated with a diagnostics profile for controlling the collection of diagnostic data the mobile device. The diagnostics profile can be dynamically retrieved from a server. When the mobile device enters the area enclosed by the geofence, the monitoring subsystem can be configured using the diagnostics profile in anticipation of an interruption of a voice or data connection. Information relating to the interruptions can be anonymously sent to a server for analysis. This information can include but is not limited to: radio frequency data, call drops, handover failures, call-related metrics or any other information that can be used to diagnose problems with a wireless communication link.

In some implementations, a server can receive information relating to connection interruptions from one or more mobile devices. The information can include location information indicating one or more locations of the mobile device at the time the connection interruptions occurred. Based on the location information, the server can identify a geographic area where connection interruptions are likely to occur. The server can define a geofence around the area and associate the geofence with a diagnostics profile for configuring a monitoring subsystem of a mobile device. The diagnostics profile and the associated geofence can be transmitted to the mobile device such that the monitoring subsystem is configured using the diagnostics profile when the mobile device enters the geofence.

These and other implementations can be utilized to achieve one or more of the following advantages. Anonymous information relating to connection interruptions can be proactively gathered. When a mobile device enters an area enclosed by a geofence where a connection interruption has occurred before or is likely to occur, the mobile device can enter a monitoring state to monitor potential call drops or data transaction errors before the call drops or data transaction errors actually occur, and to provide additional or more detailed information to a server for diagnostic analyses based on a diagnostics profile. Additionally, unnecessary data gathering can be avoided. When the mobile device exits the area enclosed by the geofence, the mobile device can enter a standard monitoring state such that resources are not wasted on monitoring. Additionally, a connection monitoring subsystem, or any subsystem of the mobile device or application programs executing on the mobile device, can be dynamically configured based on a location of the mobile device using location-based profiles, or configuration profiles associated with one or more geofences. Dynamically configuring various subsystems of the mobile device based on location can tailor functions of the mobile device to various needs of a user in various locations.

The details of one or more implementations of location-based profiles are set forth in the accompanying drawings and the description below. Other features, aspects, and advantages of location-based profiles will become apparent from the description, the drawings, and the claims.

BRIEF DESCRIPTION OF THE DRAWINGS

FIGS. 6A and 6B are flowcharts illustrating exemplary processes implementing location-based profile features and operations.

DETAILED DESCRIPTION

Location-Based Profile Overview

Figure 1B:
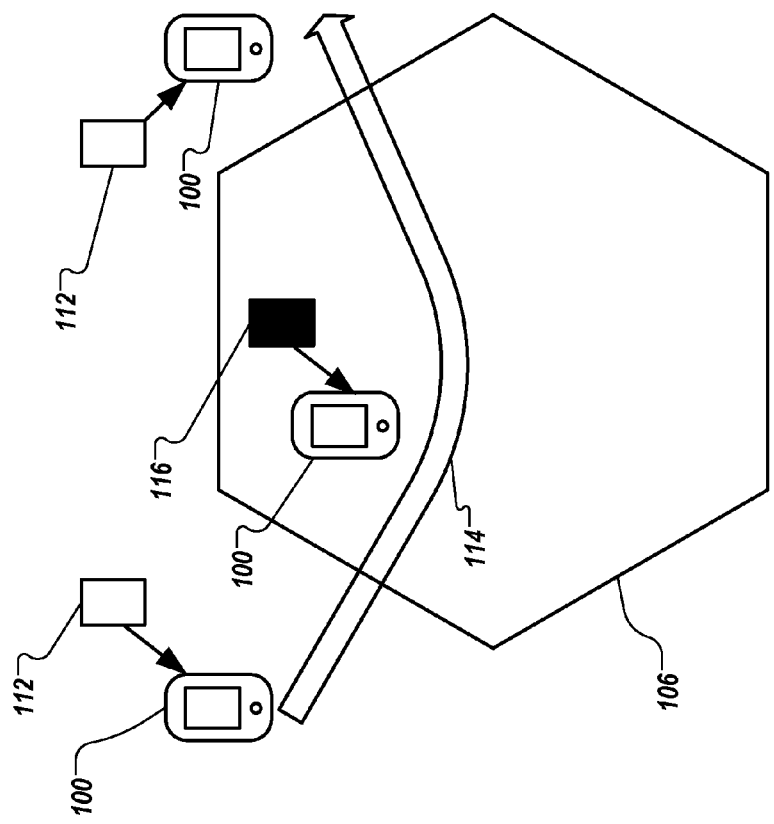
FIGS. 1A and 1B provide an overview of location-based profile techniques.
Figure 1A:
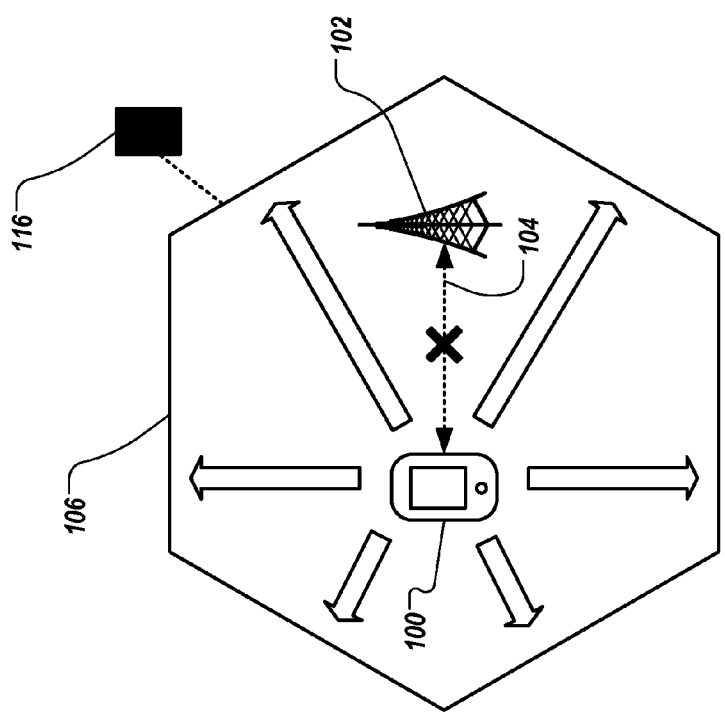

FIGS. 1A and 1B provide an overview of location-based profile techniques. Mobile device 100 can be a mobile device that implements a location-based profile. The location-based profile can include a profile that includes one or more parameters for configuring a subsystem of mobile device 100. The subsystem can include a monitoring subsystem, which can include an application program executing on mobile device 100. The profile can be location-based when the profile is associated with a geofence and is used to configure the application program when mobile device 100 enters the geofence.

FIG. 1A illustrates creation of a location-based profile. Mobile device 100 can connect to wireless access node 102 of a communications network using wireless connection 104. Wireless access node 102 can include a cell tower of a cellular communications network or a wireless access point of a WLAN. Wireless connection 104 can include an analogue connection or a digital connection. A monitoring subsystem of mobile device 100 can monitor connection 104. The monitoring subsystem can include an application program that can be either a standalone application program or a part of an operating system of mobile device 100. The monitoring subsystem can be activated when mobile device powers on, when wireless connection 104 is established, or when wireless connection 104 is interrupted.

The monitoring subsystem can monitor various states and aspects of wireless connection 104, including interruptions to wireless connection 104. For example, the monitoring subsystem can determine that a call-drop event has occurred and record one or more parameters of wireless connection 104 that are related to the call-drop event.

Upon determining that an interruption to wireless connection 104 has occurred, mobile device 100 can create geofence 106 based on a location of mobile device 100 when the interruption occurred. The location can be determined using a location subsystem of mobile device 100. The location subsystem can include a global positioning system (GPS) receiver, a wireless access point triangulation program, or any hardware or software components that can determine the location with varied accuracy.

Geofence 106 can be associated with a profile to make the profile a location-based profile. Geofence 106 can have various shapes and sizes based on technology used in determining the location of mobile device 100. In some implementations, geofence 106 can be constructed using geographic coordinates of mobile device 100 and a specified radius. The geographic coordinates (e.g., latitude, longitude, and altitude coordinates) can be determined using the GPS receiver or the access point triangulation program. A circular or substantially circular region having the geographic coordinates as a center and the specified radius as a radius can be designated as the geofence.

In some implementations, geofence 106 can be constructed using a stored polygon corresponding to a cell of a cellular network to which mobile device 100 was connected before the connection was interrupted. For example, mobile device 100 can store polygons for cells of a cellular service provider of mobile device 100. Each polygon can be identified by a cell identifier that is unique to each cell tower. Mobile device 100 can identify the cell identifier of access node 102 that is a cell tower and identify the polygon associated with the cell tower. Mobile device 100 can designate the polygon as geofence 106.

In some implementations, geofence 106 can be fetched from a server. The server can store various geofences that are known to correspond to geographic areas where communication interruptions (e.g., call drops) occur often. When mobile device 100 encounters interruption to connection 104, mobile device can send a location to the server when connection 104 is restored or when a new connection is established. If the location is inside one of the geofences stored on the server, mobile device 100 can acquire the geofence from the server and designate the geofence as geofence 106.

Mobile device 100 can associate geofence 106 with diagnostics profile 116. Diagnostics profile 116 can include one or more parameters for configuring the Monitoring subsystem to monitor various aspects of a wireless connection focusing on the parameters that are specific to the connection interruption that has occurred and its location. Diagnostics profile 116, being associated with geofence 106, can be a location-based profile. Geofence 106 and diagnostics oriented profile 116 can be stored in a storage device of mobile device 100.

FIG. 1B illustrates an exemplary process of configuring a subsystem of mobile device 100 using a location-based profile. Mobile device 100 can travel along travel path 114. Before entering an area enclosed by geofence 106, a monitoring subsystem can be configured using default profile 112. Default profile 112 can specify one or more states of a wireless connection to monitor and one or more actions to perform once an interruption is detected. Default profile 112 can be stored on a storage device of mobile device 100.

As mobile device 100 travels along travel path 114, mobile device 100 can cross geofence 106 and enter the area enclosed by geofence 106. Mobile device 100 can determine that mobile device 100 has entered the area enclosed by geofence 106 based on a current location of mobile device 100. For example, mobile device 100 can determine that a distance between the current location and a center of geofence 106 is less than a radius of geofence 106. Upon the determination, mobile device 100 can configure the monitoring subsystem using diagnostics profile 116 that is associated with geofence 106. The monitoring subsystem, being configure using diagnostics profile 116, can monitor more data related to the wireless connection.

As mobile device 100 travels further along travel path 114, mobile device 100 can cross geofence 106 again and exit the area enclosed by geofence 106. Upon detecting an exit from the area enclosed by geofence 106, mobile device 100 can use another profile to configure the monitoring subsystem. For example, mobile device can use default profile 112 to configure the monitoring subsystem after mobile device 100 exits the area enclosed by geofence 106.

Exemplary Systems Implementing a Location-Based Profile

Figure 2:
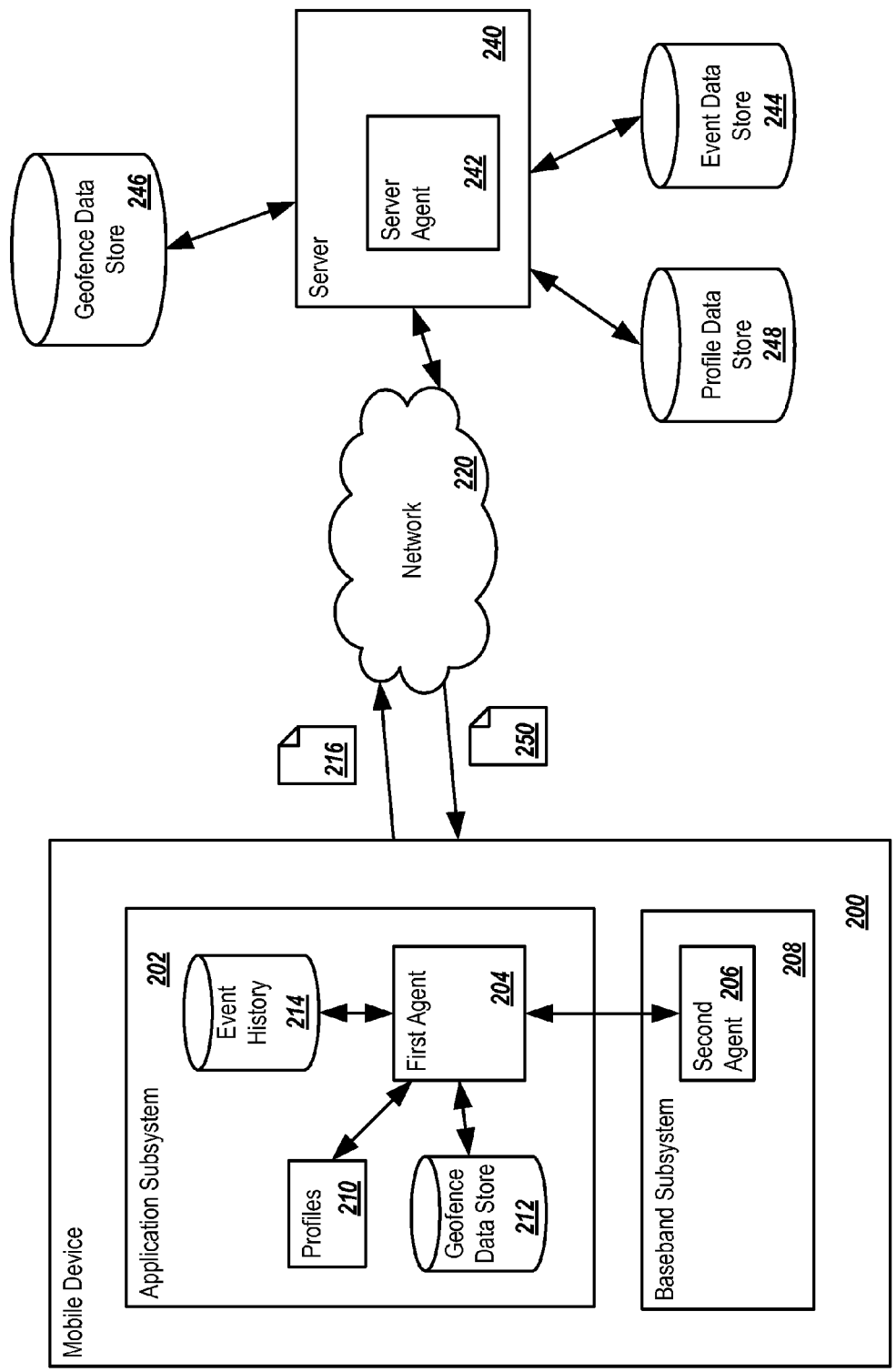
FIG. 2 is a block diagram illustrating exemplary systems and subsystems implementing a location-based profile.

FIG. 2 is a block diagram illustrating exemplary systems and subsystems implementing a location-based profile. Mobile device 200 can be a device on which location-based profile techniques are implemented. A monitoring subsystem of mobile device 200 can include a monitoring application program that executes on mobile device 200. The monitoring subsystem can be configured dynamically using one or more location-based profiles. The monitoring subsystem can include one or more components, also referred to as agents. Each agent can execute on a separate subsystem of mobile device 200.

Mobile device 200 can include application subsystem 202. The application subsystem can include an application processor, an application operating system, and various input/output devices. First agent 204 of the monitoring subsystem can collect call data, short message service (SMS) data, and other data related to data or voice communication. First agent 204 can communicate with second agent 206, which can be another component of the monitoring subsystem. Second agent 206 can execute in baseband subsystem 208 of mobile device 200. In some implementations, first agent 204 can be a master agent, whereas second agent 206 can be a slave agent.

Baseband subsystem 208 can include a baseband processor and a baseband operating system. The baseband processor can be an integrated circuit (IC) device (e.g., a Large Scale Integrated Circuit (LSI)) that performs communication functions. The baseband processor can include, for example, a Global System for Mobile Communications (GSM) modem. The baseband processor can be can be integrated with the application processor in a System-on-Chip (SoC). Second agent 206 can collect data related to wireless transmission and reception, including radio frequency (RF) data. Second agent 206 can collect data related to various parameters of cellular communication, including a cell identifier, a location area code (LAC), and a mobile country code (MCC).

First agent 204 and second agent 206 can be configured using one or more profiles 210. Profiles 210 can include one or more default profiles and one or more specialized profiles. The default profiles can be used to configure first agent 204 and second agent 206 to monitor basic aspects of a connection interruption, including, for example, time of the interruption, type of the interruption (e.g., call drop or data send/receive error), and parameters of cellular communication. Specialized profiles can include diagnostics profiles that can collect additional aspects of a connection interruption. Specialized profiles can additionally or alternatively include profiles that relate to one or more geographic areas in which a wireless or cellular service provider or a device manufacture has particular interest. For example, a specialized profile can be associated with a city to collect demographic information on cellular phone calls in the city.

Application subsystem 202 can access geofence data store 212, which can store one or more geofences to be associated with profiles 210. In some implementations, geofence data store 212 can include geofences constructed by mobile device 200 when mobile device 200 encounters communication interruptions. In some implementations, geofence data store 212 can store geofences that are polygons associated with various cell identifiers. In some implementations, geofence data store 212 can store geofences downloaded from a server.

Application subsystem 202 can access event history data store 214. Event history data store 214 can store one or more events identified from data gathered by first agent 204 and second agent 206 and one or more geofence-crossing events. Events stored in event history data store 214 can be used to activate or deactivate a geofence. After a geofence is created based on a connection interruption, mobile device 200 can update event history data store 214 each time mobile device 200 enters or exits an area enclosed by the geofence and each time mobile device 200 encounters a connection interruption in the area enclosed by the geofence. Events stored in event history data store 214 can be used to determine a frequency at which connection interruptions occur in the area enclosed by the geofence, for example, by dividing the number of times mobile device 200 encounters the connection interruption by the number of times mobile device 200 enters the geofence. If the frequency satisfies a threshold, mobile device 200 can activate the geofence and the profile associated with the geofence. If the frequency falls below a threshold, mobile device 200 can determine that the occurrences of connection interruptions within the area enclosed by the geofence need not be specifically monitored, and deactivate the geofence the profile associated with the geofence. Deactivating the geofence can include removing the geofence from geofence data store 212.

Data gathered by first agent 204 and second agent 206 can be anonymized to remove information that can identify mobile device 200 or a user of mobile device 200. For example, mobile device 200 can determine whether the data include telephone numbers, Internet Protocol (IP) addresses, and user names. If such information is included in the data, mobile device 200 can remove the information.

Anonymized information 216 can be sent to server 240 through communications network 220. Anonymized information 216 can include data gathered by first agent 204 and second agent 206, as well as location information. The location information can indicate a location where a connection interruption occurred. The location can be represented using geographic coordinates, a cell identifier, or another identifier that can identify a location (e.g., an identifier of a geofence stored on server 240). Mobile device 200 can send anonymized information 216 to server 240 at specified intervals, at each time when an interrupted connection is restored, or through a second communication channel when a first communication channel is interrupted. For example, mobile device 200 can send anonymized information 216 to server 240 using a data channel when a connection through a telephony channel is interrupted.

Server 240 can include server agent 242 that can receive anonymized information 216. Server 240 can be coupled with or connected to event data store 244, which can store received information. Server 240 can perform data analysis (e.g., statistical analysis) on information stored in event data store 244 to determine one or more geographical areas where communication interruptions are likely to occur. Server 240 can create one or more geofences around these areas. The geofences created by server 240 can be stored in geofence data store 246.

Server 240 can be coupled with or connected to profile data store 248. Profile data store 248 can store one or more profiles for configuring monitoring subsystems on mobile device 200 and mobile devices of various types. The profiles stored in profile data store 248 can include default and specialized profiles. Specialized profiles can include customized profiles. Server 240 can create customized profiles based on statistical analysis of information stored in event data store 244. For example, if a particular type of connection interruption has a likelihood to occur in a particular geofence where the likelihood exceeds a threshold, a customized profile can be created to be associated with the geofence. The customized profile can configure first agent 204 or second agent 206 to monitor aspects that are more specific to the particular type of connection interruption.

Profiles stored in profile data store 248 and geofences created by server 240 and associated with the profiles can be packaged into update data 250. Mobile device 200 can acquire update data 250 by requesting update from server 240. The request can be sent periodically (e.g., every three weeks) or in response to a trigger event. The profiles received from server 240 can supplement or replace profiles 210. The geofences received from server 240 can be stored in geofence data store 212. In some implementations, a location-based diagnostic profile is sent from server 240 when the mobile device is in the area surrounded by the geofence. Profiles in profile data store 248 can be updated upon a geofence crossing. The monitoring starts when the geofence is crossed based on the profile. A report to server 240 can be made while the device is in the geofenced area.

Figure 3:
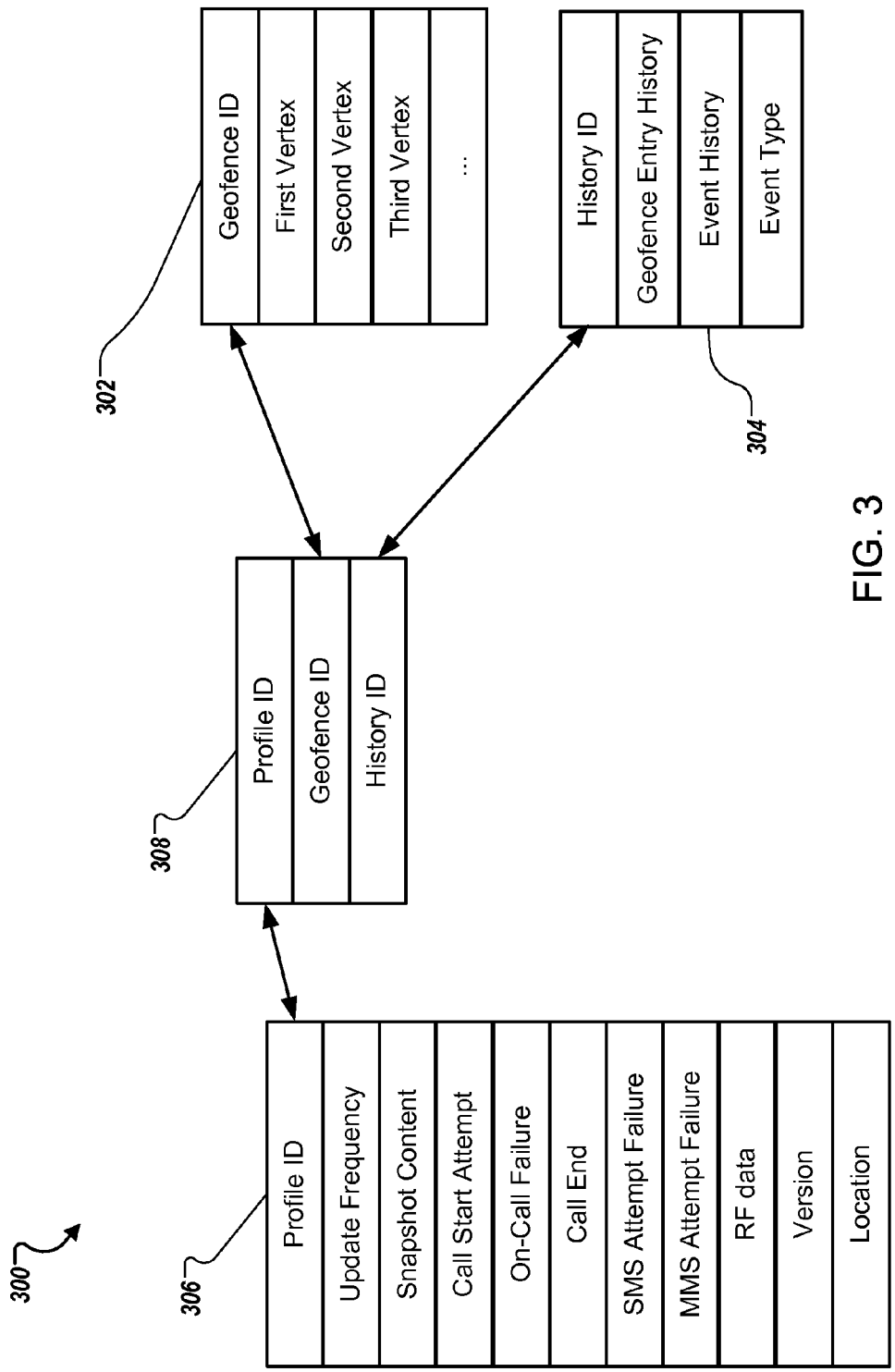
FIG. 3 illustrates an exemplary data structure for implementing location-based profile features and operations on a mobile device.

FIG. 3 illustrates an exemplary data structure for implementing location-based profile features and operations on a mobile device. Exemplary data structure 300 can be implemented using various techniques, including arrays, linked lists, one or more relational databases, or one or more object-oriented databases. For convenience, exemplary data structure 300 will be described in terms of one or more tables of a relational database having a star schema. The tables can include dimension tables 302, 304, and 306, and fact table 308.

Dimension tables 302, 304, and 306 each can describe a value of a dimension and can be joined by fact table 308. Dimension table 302 can be a geofence table that includes definitions of one or more geofences that are associated with one or more profiles. Data in dimension table 302 can be heterogeneous data. Each geofence can have a definition that is different from definitions of other geofences. For example, a first geofence can be defined using multiple vertices that define a polygon or polyhedron. Each vertex can be defined using a set of geographic coordinates that include a latitude, a longitude, and an altitude. A second geofence can be defined using a center and radius. Heterogeneous geofence data can be stored using object-oriented technology. For example, an abstraction layer can be used to describe a generic geofence. Each geofence can include a geofence identifier and an indicator that indicates whether the geofence is two-dimensional or three-dimensional. The geofence identifier can be a key of dimension table 302.

Dimension table 304 can be a history table that includes information on occurrences of various events, including events related to connection interruption. Dimension table 304 can include, for example, a number of times a mobile device enters a geofence and a number of times an event occurred. Dimension table 304 can store an event type. Dimension table 304 can use a history identifier as a key. In some implementations, exemplary data structure 300 can include a snowflake structure where dimension table 304 can be a fact table of a deeper layer of a star including other dimension tables (e.g., an event type dimension table and dimension table 302).

Dimension table 306 can be a profile table that includes information on various profiles. Each profile can include various configuration parameters to configure a subsystem (e.g., a monitoring subsystem). The configuration parameters can describe what aspects of a connection interruption to monitor, and the details of each aspect. For example, a profile stored in dimension table 306 can include an update frequency field. The update frequency field can include one or more parameters specifying a frequency to request profile updates from a server. The profile can include a snapshot content field. The snapshot content field can include one or more parameters specifying what information to collect upon an occurrence of an event (e.g., a communication interruption). Exemplary information can include cell identifier, LAC, radio access technology, MCC, mobile network code (MNC), and frequency band. The profile can include an on-call failure field. The on-call failure field can include one or more parameters specifying whether to monitor call drops and baseband crashes. The profile can include a call end field. The call end field can include one or more parameters specifying whether to monitor a call that ended in success or a call that ended in failure. The profile can include an SMS attempt field. The SMS attempt field can include one or more parameters specifying whether to monitor SMS attempts that end in success or failure. The profile can include a multimedia messaging service (MMS) attempt field. The MMS attempt field can include one or more parameters specifying whether to monitor MMS attempts that end in success or failure. The profile can include an RF data field. The RF data field can include one or more parameters specifying what information to collect that relates to RF data. Exemplary information relating to RF data can include a radio frequency, a number of hops, one or more handovers, one or more handover failures, and one or more messages from a communications network. The profile can include a version data field. The version data field can include one or more parameters specifying what information to collect that relates a version of the mobile device. Exemplary version information can include a hardware version, a firmware version, and a software version. The profile can include a location field. The location field can include one or more parameters specifying a positioning system granularity, e.g., what granularity of location can be used for monitoring and stored in association with an event. Exemplary location granularities include a GPS based granularity, a WiFi™ based granularity, and a cell identifier based granularity. Dimension table 306 can use a profile identifier as a key.

Dimension tables 302, 304, and 306 can be linked using fact table 308. Fact table 308 can include a set of foreign keys that make up a compound primary key including a combination of relevant dimension keys. The dimension keys can be simple or compound keys (e.g., geofence identifier, history identifier, and profile identifier). In some implementations of location-based profiles, a mobile device can monitor a current location, compare the current location with geofences stored in dimension table 302. If the mobile device determines that the mobile device is currently inside an area enclosed by a geofence, the mobile device can identify a profile stored in dimension table 306 that is associated to the geofence according to fact table 308. The mobile device can identify a history stored in dimension table 304 that is associated to the geofence and the profile according to fact table 308. If the history indicates that the profile can be used to configure a monitoring subsystem, the mobile device can configure the application program using the profile. Upon detecting that the mobile device exited the area, a default profile can be restored. If the history indicates that, based on a frequency of the occurrence of the event, the profile is no longer necessary, the mobile device can remove the profile from dimension table 306 and clean up in relevant tables (e.g., by removing a corresponding entry in dimension tables 302 and 304 and fact table 308).

Figure 4:
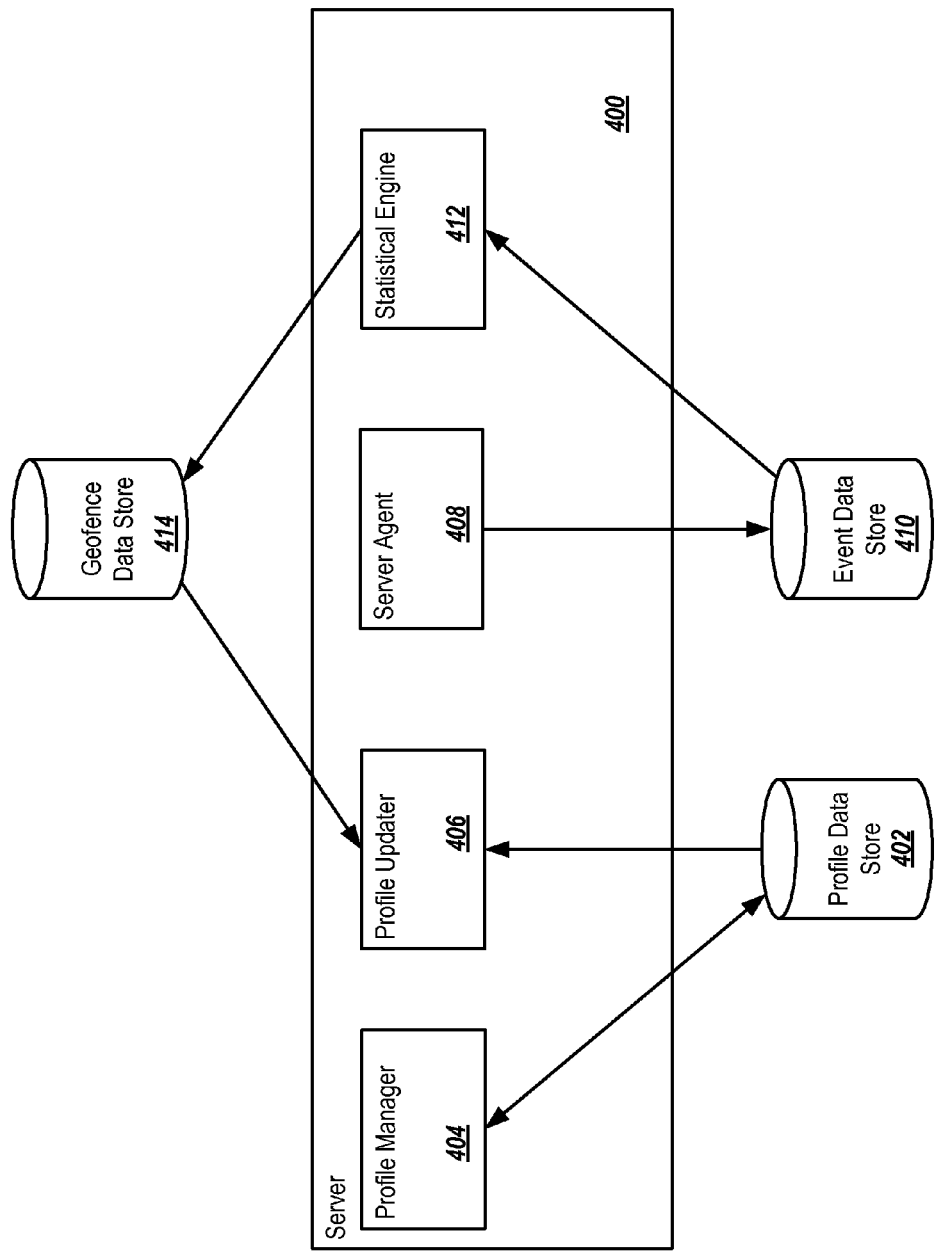
FIG. 4 is a block diagram illustrating exemplary components of a server implementing location-based profile features and operations.

FIG. 4 is a block diagram illustrating exemplary components of a server implementing location-based profile features and operations. Server 400 can be connected to one or more mobile devices through a wireless or wired communications network.

Server 400 can be coupled with or connected to profile data store 402. Profile data store 402 can store one or more profiles for configuring various subsystems, including application programs, of various types of mobile devices. For example, each make, model, version of mobile device subscribing to each voice or data service provider can have a corresponding default profile. One or more types of diagnostics profiles can be stored in profile data store as well.

Server 400 can include profile manager 404 for managing the profiles stored in profile data store 402. Profile manager 404 can perform functions including adding, deleting, and modifying the profiles stored in profile data store 402. For example, profile manager 404 can include a user interface for editing the profiles stored in profile data store 402.

Server 400 can include profile updater 406 for providing the profiles stored in profile data store 402 to one or more mobile devices for download upon request. Profile updater 406 can be configured to receive the request from the mobile device and transmit the profiles to the mobile device in response to the request.

Server 400 can include server agent 408. Server agent 408 can be configured to receive event data (e.g., anonymized information 216 as described in FIG. 2) from one or more mobile devices. The received event data can be stored in event data store 410 that is coupled with or connected to server 400.

Server 400 can include statistical engine 412. Statistical engine 412 can access event data store 410 and perform statistical analysis on the event data stored in event data store 410. The statistical analysis can include determining one or more graphical areas where one or more particular types of events (e.g., a type of connection interruption) are likely to occur. Statistical engine can delineate the areas by creating a geofence around each of the areas. The created geofences can be stored in geofence data store 414 that is coupled with or connected to server 400. The created geofences stored in geofence data store 414 can be sent to one or more mobile devices during updates through profile updater 406. In some implementations, a particular geofence stored geofence data store 414 can be associated with one or more profiles stored in profile data store 402 when the profiles are sent to the mobile devices for update.

Figure 5:
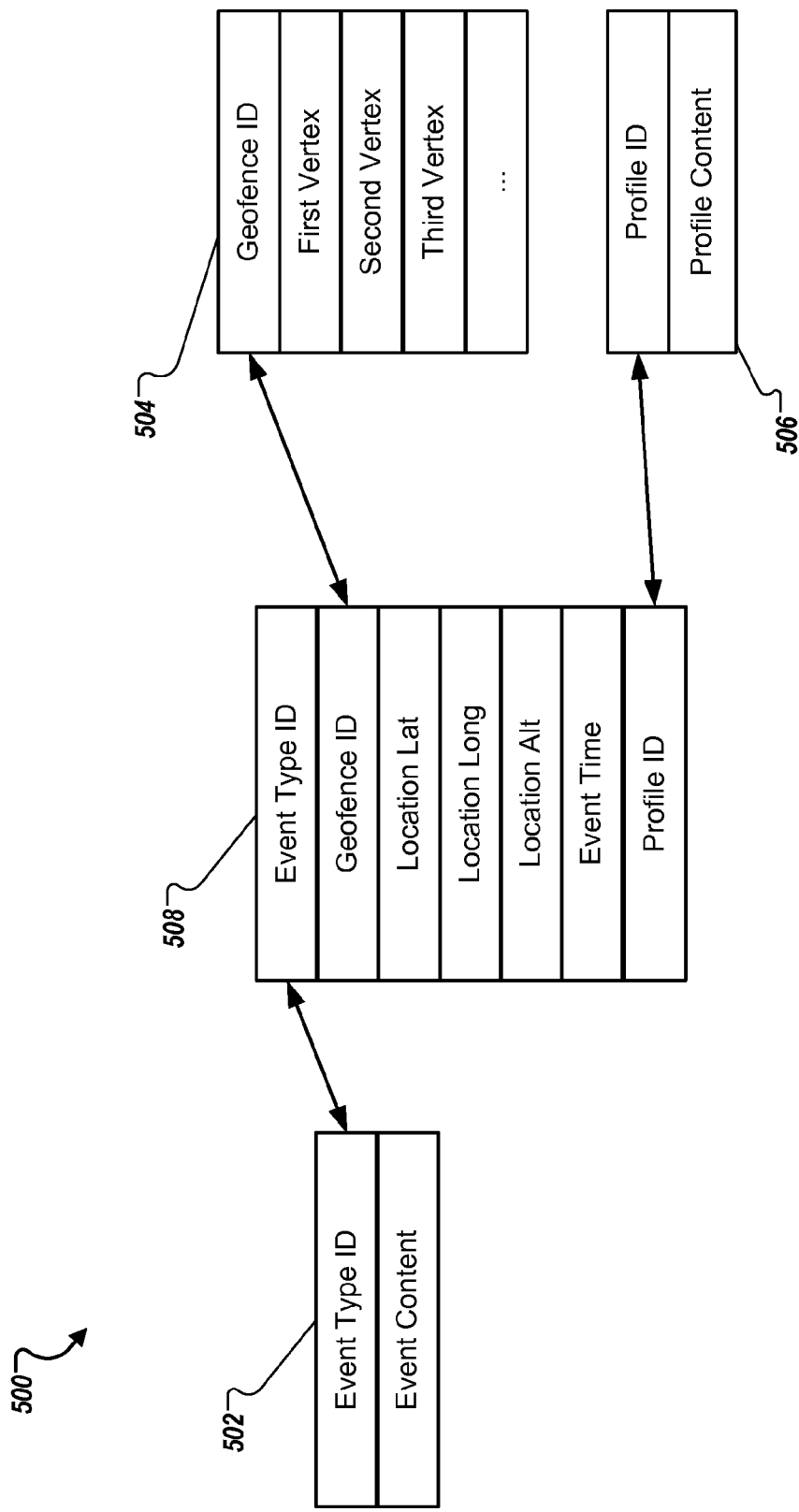
FIG. 5 illustrates an exemplary data structure for implementing features and operations of location-based profiles on a server.

FIG. 5 illustrates an exemplary data structure for implementing features and operations of location-based profiles on a server. Exemplary data structure 300 can be implemented using various techniques, including arrays, linked lists, one or more relational databases, or one or more object oriented databases. For conveniences, exemplary data structure 500 will be described in references to one or more tables of a relational database.

Event type table 502 can store data relating to various types of events, including connection interruption events. The data relating to various events can be heterogeneous data having various types, each type of data describing a type of event. The data can be stored using object-oriented technology that includes various layers of abstraction. Event type table 502 can be keyed based on event identifiers.

Geofence table 504 can store one or more geofences. The geofences can include geofences created on the server based on statistical analysis of the events. The geofences can include geofences created around specific areas when particular profiles are specified for the specific areas. For example, a geofence can be created around a city, a city block, or a highway when a diagnostics profile is to be used in the city, city block, or highway. The diagnostics profile, as well as other profiles, can be stored in profile table 506.

Event type table 502, geofence table 504, and profile table 506 can be linked together in event table 508. Event table 508 can store data relating to various events having various event types. Event table 508 can store locations where the event occurred including, for example, latitudes, longitudes, and altitudes as received from one or more mobile devices. Event table 508 can store a time of the event. Event table 508 can store an event type identifier that corresponds to a type of the event, a geofence identifier for associating the event with a geofence, and a profile identifier of a profile used by the mobile device when the event occurred.

Exemplary Processes Implementing a
Location-Based Profile

Figure 6A:
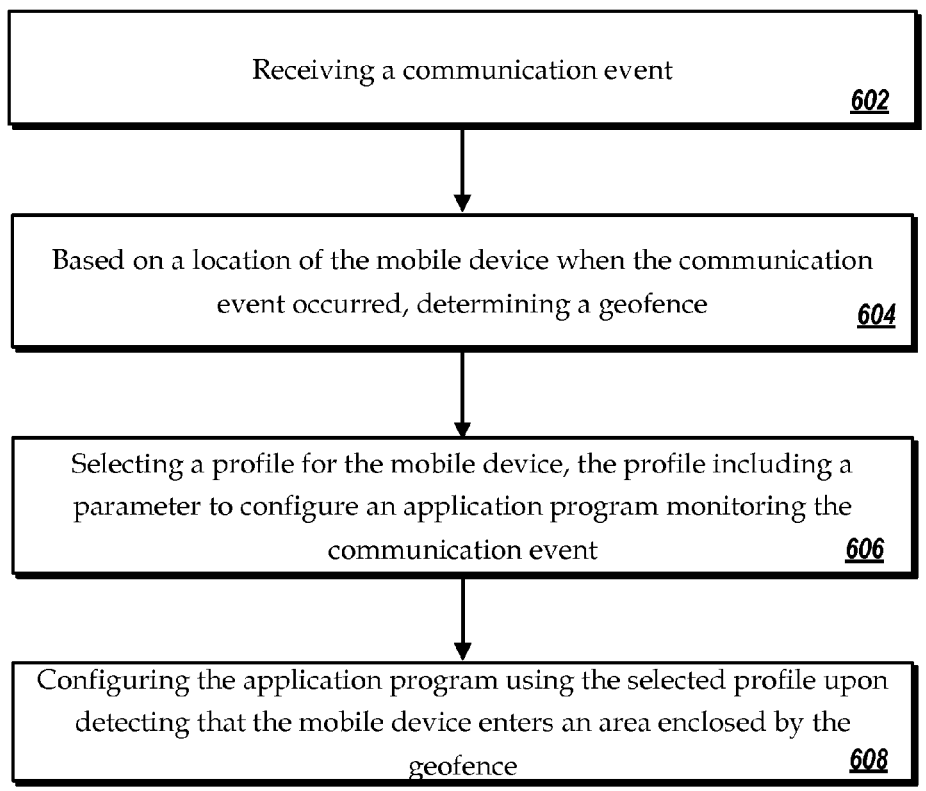

FIGS. 6A and 6B are flowcharts illustrating exemplary processes implementing location-based profile features and operations. FIG. 6A is a flowchart illustrating exemplary process 600 executed on a mobile device or client device.

The mobile device can receive (602) a communication event. Receiving the communication event can include receiving at least one of a telephony event or a data transfer event. Receiving the telephony event can include receiving a call drop. Receiving a data transfer event can include includes receiving at least one of a message service error or an activation failure.

Based on a location of the mobile device when the communication event occurred, the mobile device can determine (604) a geofence. The geofence can define a closed geographic area. The closed geographic area can include the location of the mobile device when the communication event occurred, a location of a wireless access point or cell tower to which the mobile device is connected, or both. In some implementations, determining the geofence based on the location of the mobile device can include determining a current location of the mobile device. The current location can correspond to a location of the mobile device when the communication event occurred. The mobile device can determine the location using various technologies (e.g., GPS, WiFi™ triangulation, or cell identifier). The mobile device can select a geofence from a geofence data store based on the current location. In some implementations, the mobile device can create a geofence by designating the current location as a center of a substantially circular area and associating a specified radius with the current location. In some implementations, determining the current location of the mobile device can include determining a current cell identifier in a cellular communication network. Selecting the geofence can include selecting a geofence associated with the current cell identifier.

In some implementations, exemplary process 600 can include receiving one or more geofences from a server. The one or more geofences received from the server can be determined according to locations of multiple monitored communication events using statistical analysis. The received one or more geofences can be received in a geofence data store. Receiving the one or more geofences from the server can occur periodically or upon request.

The mobile device can select (606) a profile for the mobile device. The profile can include a parameter to configure an application program monitoring the communication event. The parameter can include a parameter for monitoring a telephony (or voice) aspect of the communication event or a data aspect of the communication event. The communication event can include a connection interruption event. Selecting a profile for the mobile device can includes request the profile from a server based on the location of the mobile device and the communication event. The request can be made using a new connection (e.g., a data communication channel) or upon restoration of an interrupted connection.

The mobile device can configure (608) the application program using the selected profile upon detecting that the mobile device enters an area enclosed by the geofence. Configuring the application program using the selected profile can include configuring the application program to monitor specified aspects of the communication event.

In some implementations, exemplary process 600 can include monitoring one or more occurrences of a communication event using an application program according to the selected profile. The profile can be a diagnostics profile that is selected based on a geofence crossed by the mobile device. The diagnostics profile can configure the application program to monitor aspect of a connection interruption that can aid identifying operation anomalies of a cell tower or a wireless access point. Monitoring the one or more occurrences of the communication event can include monitoring one or more of a cell snapshot of a cellular network as specified in the profile. Monitoring the one or more occurrences of the communication event can include monitoring a call start, an on call failure, a call end, radio frequency data, a location granularity, and a profile data store update frequency. The location granularity can include a GPS granularity, a wireless access point granularity, or a cell identifier granularity. The profile data store update frequency can specify a frequency that the mobile device seeks updating of the profile data store from a server.

In some implementations, exemplary process 600 can include creating an event history of the geofence. The event history can record one or more occurrences of the communication event and one or more entries of the mobile device into the geofence. The mobile device can calculate an event frequency based on the event history. Upon entering an area enclosed by a geofence, the mobile device can configure the application program using a diagnostics profile when the event frequency satisfies a threshold (e.g., when the event occurs with sufficient regularity), or configure the application program using another profile (e.g., a default profile) when the event frequency fails to satisfy a threshold (e.g., when the event is a one-off event). The mobile device can configure the application program using the other profile when the mobile device exits the area enclosed by the geofence.

FIG. 6B is a flowchart illustrating exemplary process 640 executed on a server serving one or more mobile devices. The server can receive (642) event notifications from one or more mobile devices. Each of the event notifications can include anonymized information describing a communication event occurred on a mobile device. The information can include a location indicator indicating a location of the mobile device where the communication event occurred.

The server can determine (644) that category of communication events occur at a frequency that satisfies a threshold. The category of communication events can occur within a statistically identified geofence. The statistically identified geofence can be a geofence created on the server based on statistical analysis of received events.

The server can create (646) an event-monitoring profile to configure an event-monitoring subsystem that executes on one of the mobile devices. The event-monitoring profile can specify aspects that relate to a particular category of communication events. The event-monitoring profile can be associated with the identified geofence.

The server can provide (648) the event-monitoring profile and the associated geofence to the mobile devices to configure the event-monitoring program. Providing the event-monitoring profile and the associated geofence can include providing the event-monitoring profile and the associated geofence for downloading to the mobile device on regular basis.

Figure 7:
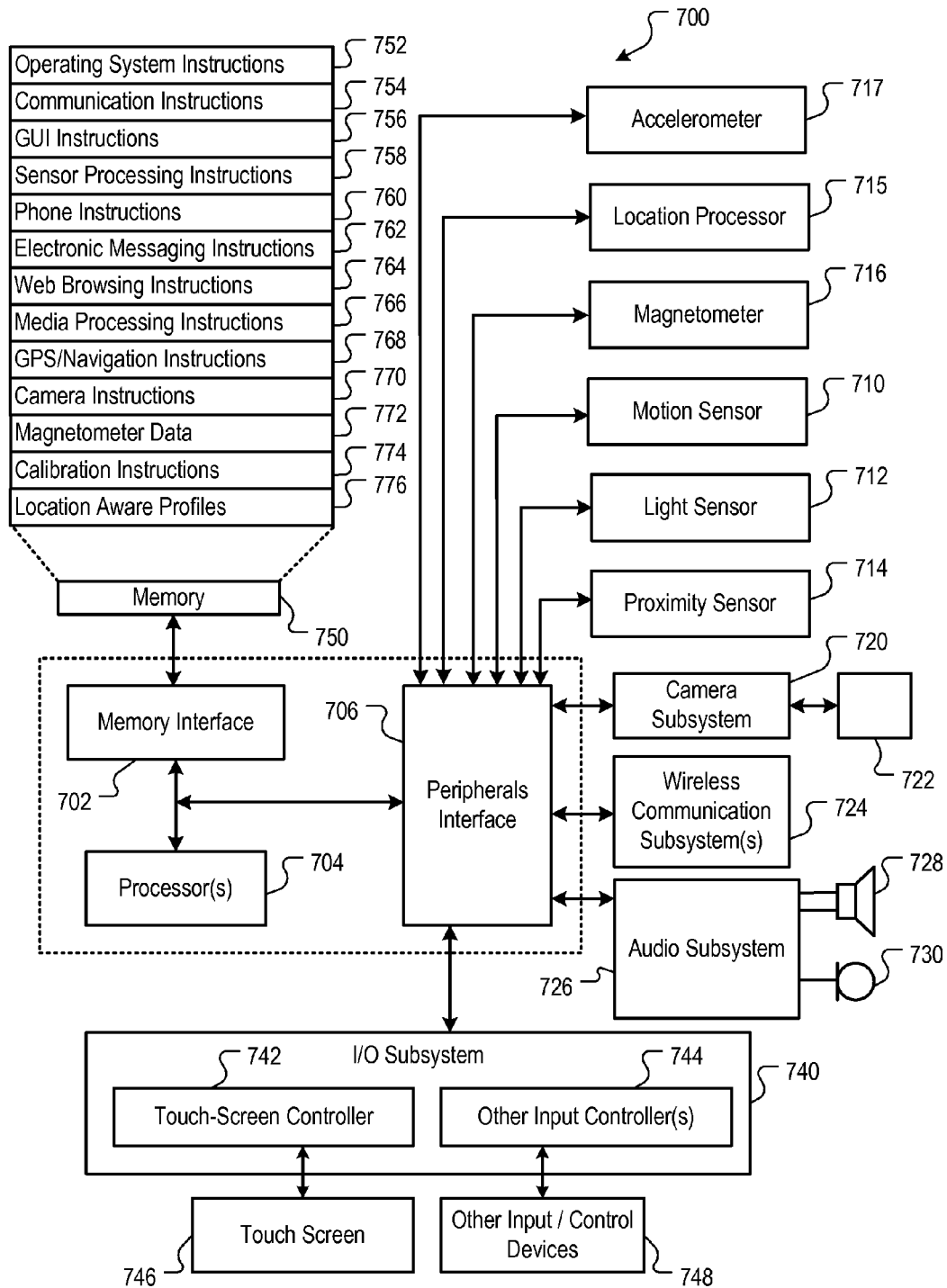
FIG. 7 is a block diagram illustrating an exemplary device architecture of a mobile device implementing location-based profile features and operations.

FIG. 7 is a block diagram illustrating exemplary device architecture 700 of a mobile device implementing location-based profile features and operations. A mobile device (e.g., mobile device 100 or mobile device 200 as described in FIGS. 1 and 2) can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

The mobile device can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include application processors (APs) and baseband processors (BPs). The various components in the mobile device, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communications network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to the mobile device on or off. The user may be able to customize a functionality of one or more of the buttons. The touch screen 746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player. The mobile device may, therefore, include a pin connector that is compatible with the mobile device. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include one or more location-based profiles 776 that can be associated with one or more geofences. The location-based profiles 776 can be used to configure one or more monitoring subsystems to monitor various events including wireless connection interruptions. The location-based profiles 776 can include diagnostics profiles that are specially tailored for one or more type of events and one or more associated geofences.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
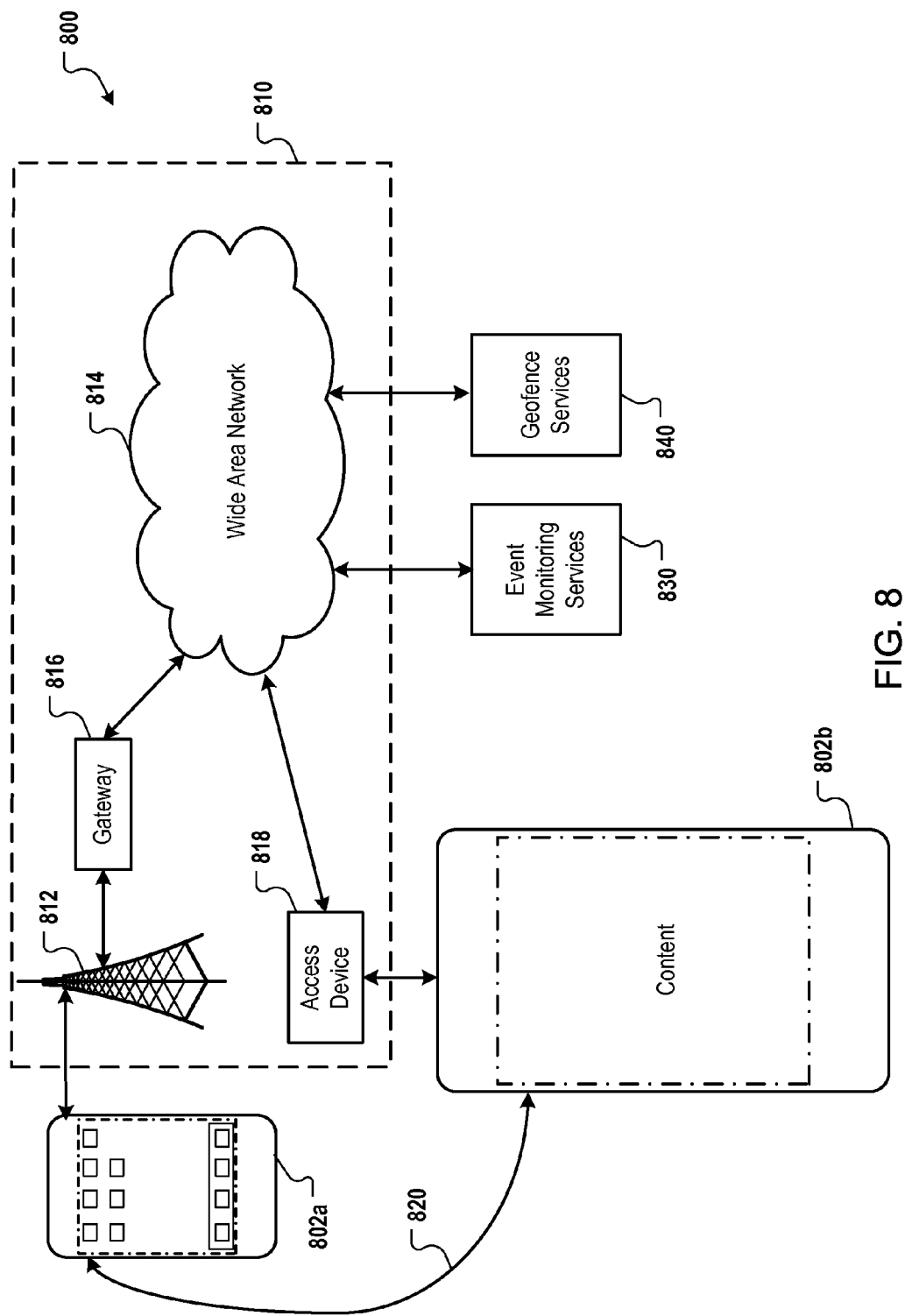
FIG. 8 is a block diagram of an exemplary network operating environment for the mobile devices implementing location-based profile features and operations.

FIG. 8 is a block diagram of exemplary network operating environment 800 for the mobile devices implementing location-based profile features and operations. Mobile devices 802a and 802b can be mobile device such as mobile device 100 of FIG. 1. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless mobile device 802a can communicate with other wireless devices, e.g., other mobile devices 802a or 802b, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830 and 840 over the one or more wired and/or wireless networks. For example, one or more event monitoring services 830 can include one or more server agents for receiving anonymized information from mobile devices 802a and 802b, determining one or more geofences including areas where a connection interruption is likely to occur using statistical analysis, creating customized profiles for the geofences, and providing the profiles and geofences for downloading by mobile devices 802a and 802b. One or more geofence services 840 can store geofences determined using statistical analysis and geofences that are tailored to enclose areas of particular interest to equipment manufacturers and service providers, and provide the stored geofences to 802a and 802b.

Mobile device 802a or 802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

Exemplary System Architecture

Figure 9:
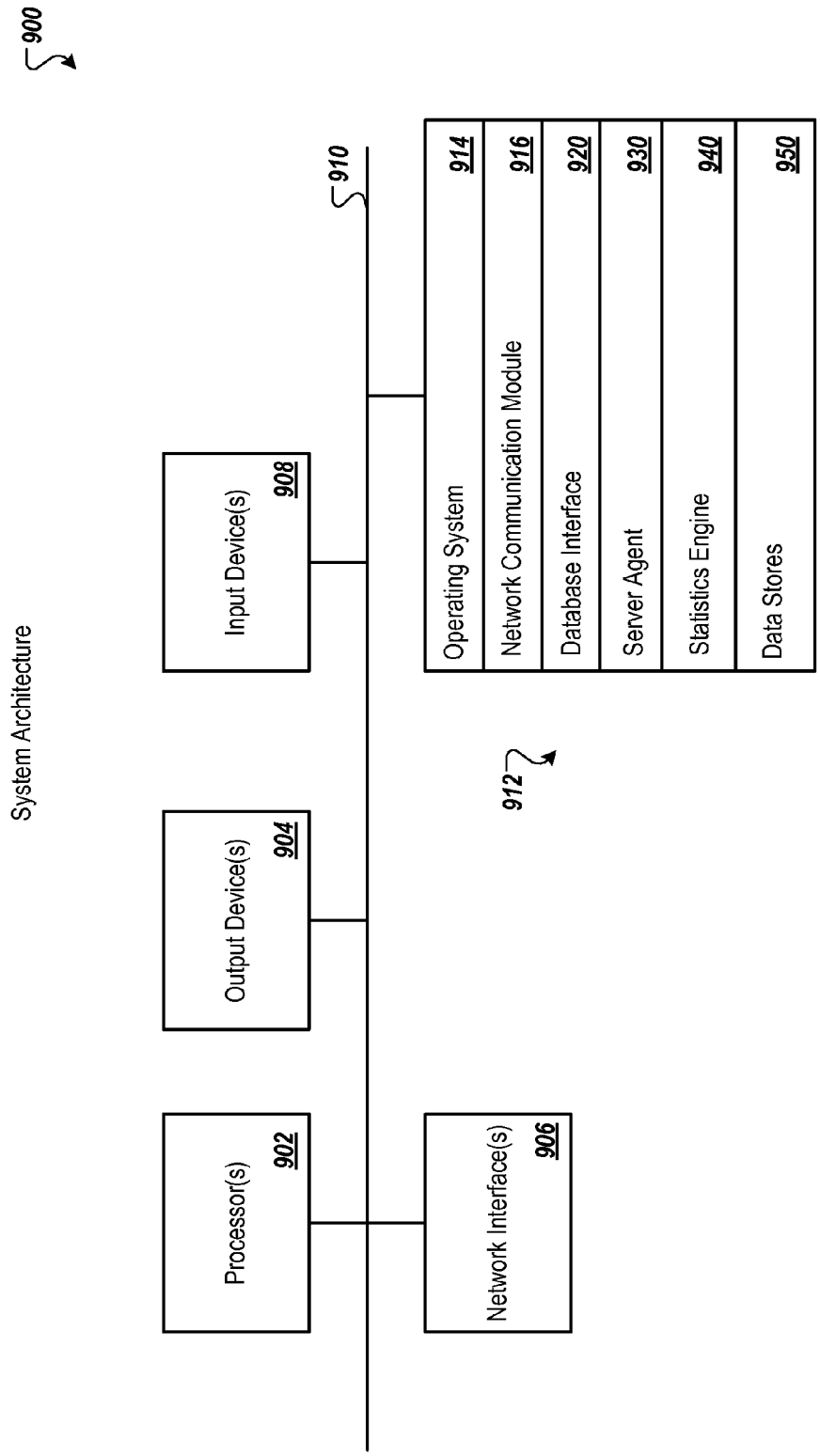
FIG. 9 is a block diagram of an exemplary system architecture for implementing the location-based profile features and operations on a server.

FIG. 9 is a block diagram of an exemplary system architecture 900 for implementing the features and operations of a location-based profile. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory), and transmission media. Transmission media includes, without limitation, coaxial cables, copper wire, and fiber optics.

Computer-readable medium 912 can further include operating system 914 (e.g., Mac OS® server, Windows® NT server), network communication module 916, database interface 920, server agent 930, statistics engine 940, and data stores 950 logic 950. Database interface 920 can provide one or more user interfaces, interfaces between a server computer and a client computer, and interfaces between a relational database and other application program. Server agent 930 can be utilized to receive event data from one or more mobile device. Statistics engine 940 can determine one or more geofences where various types of events are likely to occur. Data stores 950 can include event data stores, geofence data stores, and profile data stores that can store event data, geofence data, and profile data.

Operating system 914 can be multi-user, multiprocessing, multitasking, multithreading, real time, etc. Operating system 914 performs basic tasks, including but not limited to: recognizing input from and providing output to devices 904 and 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interface to various databases including relational databases.

Architecture 900 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, a monitoring subsystem including an application program is described. The location-based profile can be used to configure other subsystems or programs. Accordingly, other implementations are within the scope of the following claims.

What is claimed is:
1. A method executed by a mobile device, comprising:
  detecting a communication event that includes a communication interruption;
  triggering, by the communication event, creation of a geofence, wherein creating the geofence comprises:

determining a location of the geofence based on a location of the mobile device when the communication event occurred; and determining a profile for associating with the geofence, the profile including a parameter to configure an application program for monitoring an aspect of the communication in anticipation of a next communication interruption that is expected to occur within the geofence, wherein determining the profile comprises selecting the profile from a profile data store on the mobile device or receiving the profile from a server; and upon detecting that the mobile device enters an area enclosed by the geofence and before the next communication interruption occurs, configuring the application program to monitor the aspect of the communication using the profile.

2. The method of claim 1, comprising sharing the geofence with another mobile device.

3. The method of claim 1, where:
detecting the communication event includes receiving at least one of a telephony event or a data transfer event;
receiving the telephony event includes receiving a call drop; and
receiving the data transfer event includes receiving at least one of a message service error or an activation failure.

4. The method of claim 1, where the geofence defines a closed geographic area.

5. The method of claim 1, where determining the location of the geofence based on the location of the mobile device includes:
determining a current location of the mobile device, the current location corresponding to the location of the mobile device when the communication event occurred; and
selecting a geofence from a geofence data store based on the current location.

6. The method of claim 5, where:
determining the current location of the mobile device includes determining a current cell identifier in a cellular communication network; and
selecting the geofence includes selecting a geofence associated with the current cell identifier.

7. The method of claim 5, further comprising:
receiving one or more geofences from a server, the one or more geofences determined according to locations of a plurality of monitored communication events; and
storing the received geofences in the geofence data store.

8. The method of claim 1, further comprising monitoring one or more occurrences of the communication event using the application program according to the profile, where monitoring the one or more occurrences of the communication event includes monitoring one or more of a cell snapshot of a cellular network, a call start, an on-call failure, a call end, radio frequency data, a location granularity, and a profile data store update frequency.

9. The method of claim 8, where the location granularity includes a global positioning system granularity, a wireless access point granularity, or a cell identifier granularity.

10. The method of claim 8, where the profile data store update frequency specifies a frequency that the mobile device seeks updating of the profile data store.

11. The method of claim 1, where receiving the profile from the server includes requesting the profile from the server based on the location of the mobile device and the communication event and receiving the profile in response.

12. The method of claim 1, further comprising:
creating an event history of the geofence, the event history recording one or more occurrences of the communication event and one or more entries of the mobile device into the geofence;
calculating an event frequency based on the event history; and
configuring the application program using another profile when the event frequency satisfies a threshold.

13. The method of claim 1, further comprising:
configuring the application program using another profile when the mobile device exits the area enclosed by the geofence.

14. A computer program product stored on a storage device, operable to cause one or more processors to perform operations comprising:
detecting a communication event relating to wireless communication of a mobile device the communication event including a communication interruption;
triggering, by the communication event, creation of a geofence, wherein creating the geofence comprises:
determining a location of the geofence based on a location of the mobile device when the communication event occurred; and
determining a profile for associating with the geofence, the profile including a parameter to configure an application program for monitoring an aspect of the communication in anticipation of a next communication interruption that is expected to occur within the geofence, wherein determining the profile comprises selecting the profile from a profile data store on the mobile device or receiving the profile from a server; and
upon detecting that the mobile device enters an area enclosed by the geofence and before the next communication interruption occurs, configuring the application program to monitor the aspect of the communication using the profile.

15. The product of claim 14, where detecting the communication event includes receiving at least one of a telephony event or a data transfer event.

16. The product of claim 15, where:
receiving the telephony event includes receiving a call drop; and
receiving the data transfer event includes receiving at least one of a message service error or an activation failure.

17. The product of claim 14, the operations further comprising sharing the profile and the geofence with another mobile device.

18. The product of claim 14, the operations further comprising configuring the application program using another profile upon detecting that the mobile device exits the area enclosed by the geofence.

19. A system comprising:
one or more processors; and
a storage device storing a computer program product operable to cause the one or more processors to perform operations comprising:
detecting a communication event relating to wireless communication of a mobile device that includes a communication interruption;
triggering, by the communication event, creation of a geofence, wherein creating the geofence comprises:
determining a location of the geofence based on a location of the mobile device when the communication event occurred; and determining a profile for associating with the geofence, the profile including a parameter to configure an subsystem for monitoring an aspect of the communication in anticipation of a next communication interruption that is expected to occur within the geofence, wherein determining the profile comprises selecting the profile from a profile data store on the mobile device or receiving the profile from a server; and upon detecting that the mobile device enters an area enclosed by the geofence and before the next communication interruption occurs, configuring the subsystem to monitor the aspect of the communication using the profile.

20. The system of claim 19, where detecting the communication event includes receiving at least one of a telephony event or a data transfer event;

receiving the telephony event includes receiving a call drop; and receiving the data transfer event includes receiving at least one of a message service error or an activation failure.

21. The system of claim 19, where the subsystem includes a monitoring application program.

22. The system of claim 19, where determining the geofence includes:

designating as the geofence a circle centered at the location of the mobile device when the communication event occurred; and designating a specified radius for the geofence.

* * * * *